(12) United States Patent
Hong

(10) Patent No.: US 10,228,688 B2
(45) Date of Patent: Mar. 12, 2019

(54) DRONE CONTROLLER

(71) Applicant: YooJung Hong, Yongin-si Gyeonggi-do (KR)

(72) Inventor: YooJung Hong, Yongin-si Gyeonggi-do (KR)

( * ) Notice: Subject to any disclaimer, the term of this patent is extended or adjusted under 35 U.S.C. 154(b) by 0 days.

(21) Appl. No.: 15/532,068

(22) PCT Filed: Dec. 31, 2015

(86) PCT No.: PCT/KR2015/014573
§ 371 (c)(1),
(2) Date: May 31, 2017

(87) PCT Pub. No.: WO2017/039081
PCT Pub. Date: Mar. 9, 2017

(65) Prior Publication Data
US 2017/0269587 A1 Sep. 21, 2017

(30) Foreign Application Priority Data
Sep. 4, 2015 (KR) .................. 10-2015-0125489

(51) Int. Cl.
G05D 1/00 (2006.01)
B64C 39/02 (2006.01)
(Continued)

(52) U.S. Cl.
CPC ......... G05D 1/0016 (2013.01); B64C 39/024 (2013.01); G06F 3/023 (2013.01);
(Continued)

(58) Field of Classification Search
CPC combination set(s) only.
See application file for complete search history.

(56) References Cited

U.S. PATENT DOCUMENTS 4,491,325 A * 1/1985 Bersheim ................ A63F 13/06
200/6 A
5,532,529 A * 7/1996 Codina .................. G05G 9/047
200/1 A
(Continued)

FOREIGN PATENT DOCUMENTS

JP 07-028598 5/1995
JP 11-154031 6/1999
(Continued)

OTHER PUBLICATIONS

International Search Report, dated May 25, 2016, for International Patent Application No. PCT/KR2015/014573, filed Dec. 31, 2015, 2 pages.
(Continued)

Primary Examiner — Medhat Badawi
(74) Attorney, Agent, or Firm — Weaver Austin Villeneuve & Sampson LLP

(57) ABSTRACT

The present invention relates to a drone controller capable of controlling a movement and a rotation of a drone. The present invention discloses a drone controller capable of controlling a rotation and a movement of a drone, the drone controller including: a main body which is formed in a cylindrical shape and may be held by a user with one hand; a lever which is disposed at one side of the main body, formed such that the user's finger may be inserted into the lever, and operated to move the drone in front and rear directions or left and right directions; and a button unit which is disposed at a predetermined portion of the main body, and operated so that the drone may be rotated.

17 Claims, 13 Drawing Sheets

(51) Int. Cl.
  *G06F 3/023*     (2006.01)
  *G06F 3/0338*    (2013.01)
  *G06F 3/0362*    (2013.01)
(52) U.S. Cl.
  CPC .......... *G06F 3/0338* (2013.01); *G06F 3/0362* (2013.01); *B64C 2201/146* (2013.01); *G06F 2203/0331* (2013.01); *G06F 2203/0383* (2013.01)

(56) References Cited

U.S. PATENT DOCUMENTS

| | | | | |
|---|---|---|---|---|
| 5,559,432 | A * | 9/1996 | Logue | B82Y 15/00 244/234 |
| 5,687,424 | A * | 11/1997 | Masley | A41D 19/01547 2/161.6 |
| 5,854,622 | A * | 12/1998 | Brannon | G05G 9/04737 345/161 |
| 6,154,198 | A * | 11/2000 | Rosenberg | A63F 13/06 345/156 |
| 6,160,537 | A * | 12/2000 | Liu | G05G 1/06 250/221 |
| 6,232,959 | B1 * | 5/2001 | Pedersen | G06F 1/1616 345/161 |
| 6,373,466 | B2 * | 4/2002 | Salcudean | G05G 9/047 250/208.6 |
| 6,741,233 | B1 * | 5/2004 | Swan | A63F 13/06 345/156 |
| 7,463,241 | B2 * | 12/2008 | Ushimaru | G05G 9/04796 345/156 |
| 2002/0104921 | A1 | 8/2002 | Louvel | |
| 2002/0190948 | A1 * | 12/2002 | Coutant | G05G 9/047 345/161 |
| 2004/0003985 | A1 * | 1/2004 | Nishimoto | G05G 9/04792 200/6 A |
| 2005/0162389 | A1 * | 7/2005 | Obermeyer | G05G 9/047 345/161 |
| 2006/0137931 | A1 * | 6/2006 | Berg | B62D 1/12 180/333 |
| 2007/0164150 | A1 * | 7/2007 | Van de Rostyne | A63H 27/12 244/17.21 |
| 2013/0293362 | A1 | 11/2013 | Parazynski | |
| 2013/0294016 | A1 * | 11/2013 | Wilson | A63F 13/211 361/679.01 |
| 2014/0008496 | A1 * | 1/2014 | Ye | B64C 13/20 244/190 |
| 2014/0247119 | A1 | 9/2014 | Robbins et al. | |
| 2017/0269587 | A1 * | 9/2017 | Hong | G05D 1/0016 |
| 2018/0164799 | A1 | 6/2018 | Hong | |

FOREIGN PATENT DOCUMENTS

| | | |
|---|---|---|
| KR | 2015-0093270 A | 8/2015 |
| WO | 2015-102175 A1 | 7/2015 |
| WO | 2017-039081 A1 | 3/2017 |
| WO | 2017-146531 | 8/2017 |

OTHER PUBLICATIONS

Grant of Patent, dated Aug. 23, 2016, for Korean Patent Application No. 10-2015-0125489, filed Sep. 4, 2015, 1 page.
International Search Report, dated May 23, 2017, for International Patent Application No. PCT/KR2017/002083, filed Feb. 24, 2017, 4 pages (in Korean).
U.S. Appl. No 15/532,073, filed May 31, 2017, Yoo Chung Hong.
Office Action for Korean Patent Application No. 10-2016-0022135, dated Feb. 13, 2018. [with Machine Translation].
Final Rejection for Korean Patent Application No. 10-2018-0090832, dated Jun. 5, 2018. [with Machine Translation].
Office Action for Korean Patent Application No. 10-2018-0090832, dated Aug. 21, 2018. [with Machine Translation].
Letter dated Dec. 17, 2018, from C. Scott Talbot of Cooley LLP, to Ryan J. Otis of Weaver Austin Villeneuve & Sampson LLP.

* cited by examiner

DRONE CONTROLLER

TECHNICAL FIELD

The present invention relates to a drone controller, and more specifically, to a drone controller capable of controlling a movement and a rotation of an object.

BACKGROUND ART

A drone or unmanned aerial vehicle (UAV) refers to a flight vehicle that flies by being operated in a wireless manner without a human aboard. A multi-copter drone has been initially developed for the military purpose, but because of convenience in transportation and storage, the drone is widely used to capture videos for broadcasting, and recently, the drone (unmanned flight vehicle) becomes commercially available. Because a fuselage of the drone is light in weight, the drone is conveniently and quickly carried and has excellent economic feasibility, and as a result, the drone is utilized for aerial photography, low-altitude reconnaissance patrol, and the like.

In addition, the drone is utilized in various fields in order to capture videos by using a camera at a location which it is difficult for a human to access, or to deliver an object by loading the object on the drone and moving the drone. In addition, a number of researches are being conducted to use the drone for monitoring disasters and transporting products.

Recently, the drone is in the limelight even in leisure and sports fields in which general users carry the drones and use the drones for aerial photography by using cameras. The drone becomes light in weight and small in size in comparison with the related art, and in some instances, a high-performance small camera is mounted on the drone.

Since the drone is an unmanned flight vehicle without a human aboard, the drone is operated by receiving operating signals in a wireless manner from a user typically on the ground surface. The most of the drones up to now are operated by manual operations that require a manipulation of a human.

However, a controller in the related art for operating the drone is typically controlled by the user in a state in which the user holds the controller. In addition, it is difficult to operate the drone, which causes a high barrier to use the drone. For this reason, the drones are classified in terms of type into beginner, intermediate, and expert levels and one sale. In addition, the drone uses spend much time to operate the drones in order to operate the drone well.

However, as the utilization field of the drone is expanded to the leisure and sports fields, there is a need for a drone controller that enables a user with no training in operating the drone to more conveniently and intuitively operate the drone.

DISCLOSURE

Technical Problem

The present invention has been made during the research process, and an object of the present invention is to provide a drone controller that enables a user to easily operate the drone controller with one hand instead of operating the drone controller by holding the drone controller with two hands.

In addition, another object of the present invention is to provide a drone controller that enables a user to more intuitively operate the drone controller when moving the drone upward, moving the drone downward, moving the drone, and rotating the drone.

Technical problems of the present invention are not limited to the aforementioned technical problems, and other technical problems, which are not mentioned above, may be clearly understood by those skilled in the art from the following descriptions.

Technical Solution

To solve the technical problems, a drone controller capable of controlling a motion of a drone according to an exemplary embodiment of the present invention includes: a main body; and a lever which is connected to the main body so as to be pivotable and movable vertically, in which the drone is operated to be moved in a plane direction by a pivotal motion of the lever, and the drone is operated to be moved in a vertical direction by a vertical movement of the lever.

According to the exemplary embodiment of the present invention, the drone controller may further include a button unit which is positioned on the main body and operated so that the drone is rotated about at least one of an X-axis, a Y-axis, and a Z-axis.

According to the exemplary embodiment of the present invention, the main body may be formed in a shape that enables the user to hold the main body with one hand and to operate the main body in a state in which the user holds the main body.

According to the exemplary embodiment of the present invention, an opening into which the user's finger is penetratively inserted may be formed at an end portion of the lever.

According to the exemplary embodiment of the present invention, the button unit may be movably connected to the main body, the drone may be rotated clockwise when the button unit is moved in a first direction based on a reference point, and the drone may be rotated counterclockwise when the button unit is moved in a second direction opposite to the first direction.

According to the exemplary embodiment of the present invention, the button unit may be rotatably connected to the main body, the drone may be rotated clockwise when the button unit is rotated clockwise, and the drone may be rotated counterclockwise when the button unit is rotated counterclockwise.

According to the exemplary embodiment of the present invention, the button unit may include a plurality of button keys which is formed to be pushed, the button keys may be disposed at a predetermined portion of the main body so as to be adjacent to one another and have two direction button keys, leftward and rightward button keys, the drone may be rotated counterclockwise when the leftward button key is pushed, and the drone may be rotated clockwise when the rightward button key is pushed.

According to the exemplary embodiment of the present invention, the main body may be formed in a shape that enables the user to hold the main body with one hand and to operate the main body in a state in which the user holds the main body, the button unit may be disposed in the vicinity of a portion where at least one of the user's index finger, middle finger, ring finger, and little finger is positioned when the user holds the main body, and an opening into which the user's thumb is penetratively inserted may be formed at an end portion of the lever.

According to the exemplary embodiment of the present invention, recessed portions may be formed in the main body so that the fingers except for the thumb are placed in the recessed portions when the user holds the main body.

According to the exemplary embodiment of the present invention, the main body may further include a sync button key, and the sync button key may allow a horizontal movement of the drone to coincide with a direction in which the lever pivots, on an absolute coordinate, when the sync button key is pushed.

According to the exemplary embodiment of the present invention, the lever may further include a band unit which is positioned at an end portion of the lever and surrounds the finger so that the user's finger is in close contact with the lever.

According to the exemplary embodiment of the present invention, the drone controller may further include a cover unit which is disposed at one side of the opening and surrounds the finger passing through the opening.

According to the exemplary embodiment of the present invention, the cover unit may include a curved projection which is formed at a lower side adjacent to the opening and formed to be curved so that the finger passing through the opening is caught by the curved projection when the finger is withdrawn from the opening.

Advantageous Effects

According to the drone controller of the present invention, the user may hold the controller with one hand, and control the controller only with the hand holding the controller, such that the operations of moving the drone upward, moving the drone downward, or rotating the drone may be simultaneously performed by means of the lever and the drone may be significantly and intuitively controlled, in comparison with a case in which the operations of moving the drone upward, moving the drone downward, or rotating the drone are performed by different operating units.

In addition, according to the drone controller of the present invention, there is an advantage in that the user may control the controller by holding the main body with one hand, such that the hand, which does not hold the drone controller, may be freely used to hold the drone which is ready for flight, or hold the drone which is landing.

In addition, there is an advantage in that the button unit disposed on the main body may horizontally rotate the drone, and thus it is possible to rotate the drone in place without moving the drone.

In addition, there is an advantage in that the sync button key disposed on the main body allows the front direction of the drone to coincide with the front direction of the controller, the user may more smoothly operate the drone in a desired direction.

BEST MODE

Figure 1:
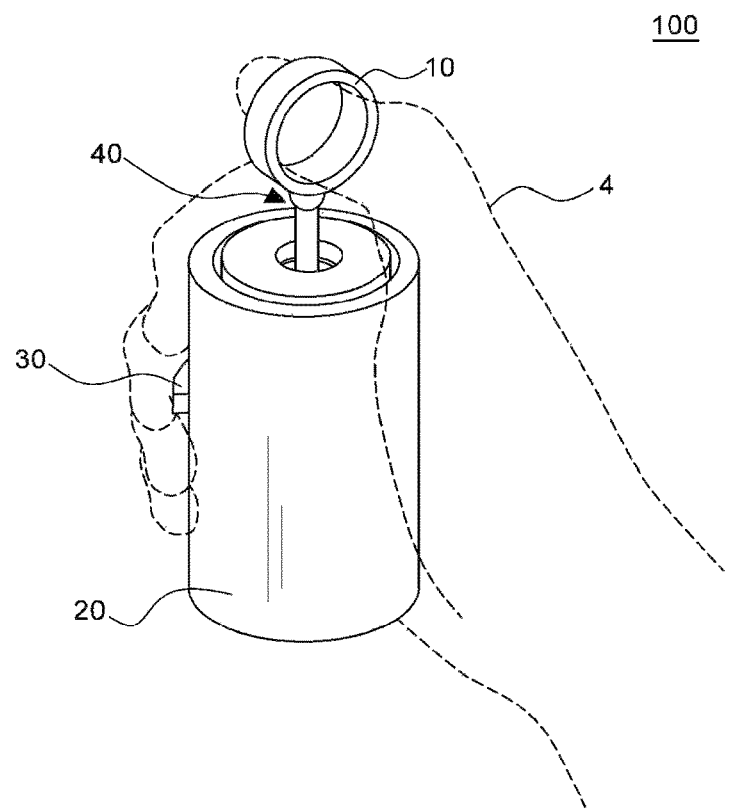
FIG. 1 is a conceptual view illustrating a state in which a user holds a drone controller according to an exemplary embodiment of the present invention.

Advantages and features of the present invention and methods of achieving the advantages and features will be clear with reference to exemplary embodiments described in detail below together with the accompanying drawings. However, the present invention is not limited to exemplary embodiment disclosed herein but will be implemented in various forms. The exemplary embodiments are provided so that the present invention is completely disclosed, and a person of ordinary skilled in the art can fully understand the scope of the present invention. Therefore, the present invention will be defined only by the scope of the appended claims.

When an element or layer is referred to as being "on" another element or layer, it can be directly on the other element or layer or intervening elements or layers may also be present. Throughout the specification, the same reference numerals denote the same constituent elements.

Terms "first", "second", and the like may be used to describe various constituent elements, but the constituent elements are not limited by these terms. These terms are used only to distinguish one constituent element from another constituent element. Therefore, the first constituent element mentioned hereinafter may of course be the second constituent element within the technical spirit of the present invention.

The term "drone" used in the present specification is not limited to a quadcopter or the like, and the drone is referred to collectively as an unmanned aerial vehicle (UAV) without a human aboard.

Figure 2:
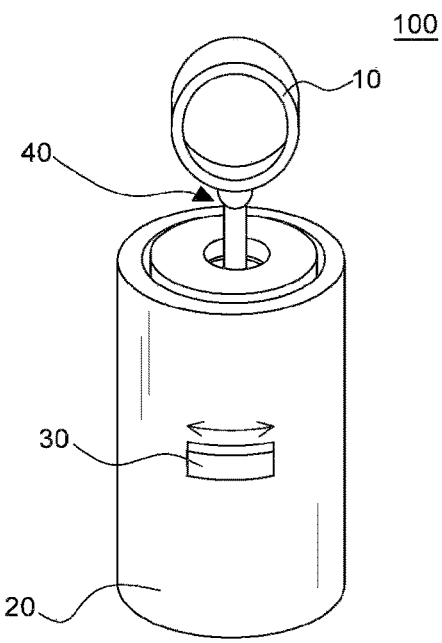
FIG. 2 is a perspective view of the drone controller illustrated in FIG. 1 when viewed in another direction.
Figure 3:
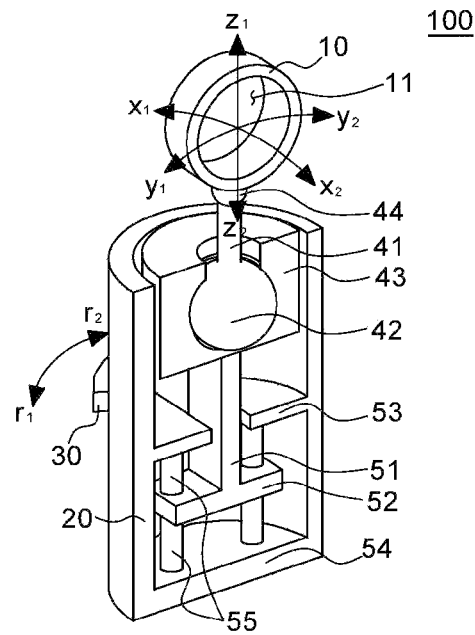
FIG. 3 is a cross-sectional perspective view illustrating a cross section of the drone controller illustrated in FIG. 1 when viewed diagonally.
Figure 4:
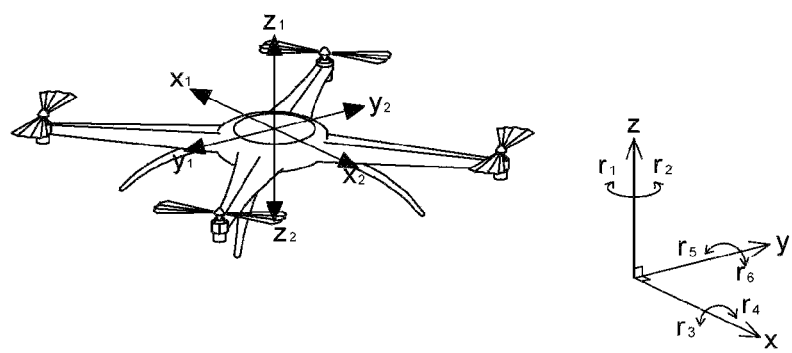
FIG. 4 is a perspective view illustrating a typical drone which may be controlled by the drone controller according to the exemplary embodiment of the present invention.

FIG. 1 is a conceptual view illustrating a state in which a user holds a drone controller 100 according to an exemplary embodiment of the present invention. FIG. 2 is a perspective view of the drone controller 100 illustrated in FIG. 1 when viewed in another direction. FIG. 3 is a cross-sectional perspective view illustrating a cross section of the drone controller 100 illustrated in FIG. 1 when viewed diagonally. FIG. 4 is a perspective view illustrating a typical drone which may be controlled by the drone controller 100 illustrated in FIG. 1.

Referring to the drawings, the drone controller 100 according to the exemplary embodiment of the present invention is a controller which is operable in a wireless manner in order to rotate and move a drone. The drone controller 100 includes a main body 20, a lever 40, and a button unit 30.

The main body 20 is formed to be held by a user with one hand. Further, the main body 20 may be formed in a shape that enables the user to operate the drone in a state in which the user may hold the main body 20 with one hand. For example, the main body 20 may be formed in a cylindrical shape. That is, a circular diameter is determined so that the cylindrical main body 20 has a perimeter which may be held by an adult user with one hand. For example, the user may support the main body 20 by surrounding a half or more than a half of the perimeter of the main body 20 with the hand.

The main body 20 may be held by the user's right hand 4, and unlike the configuration illustrated in the drawing, the main body 20 may be formed to be held by the user's left hand. To this end, the lever 40 may be formed to be rotatable with respect to the main body 20.

Meanwhile, unlike the configuration illustrated in the drawings, recessed portions may be formed in the main body 20 so that fingers other than the thumb may be placed in the recessed portions when the user holds the main body 20. That is, the main body 20 may be recessed in a direction in which the user's fingers hold the main body 20. In this case, the main body 20 may be formed such that the user's fingers may be placed in the recessed portions of the main body 20 when the user holds the main body 20. Since the user's finger is placed in the recessed portion, the user's finger is caught by portions protruding at both sides of the recessed portion. As a result, the main body 20 may be more stably supported by the user's fingers. A degree to which the main body 20 is recessed is set to a degree which enables the user to sufficiently support the main body 20, and the degree may be clearly understood by those skilled in the art.

The lever 40 may be connected to the main body 20 so as to be pivotable with respect to the main body 20. Further, the lever 40 may be connected to the main body 20 so as to be movable vertically with respect to the main body 20. The lever 40 may pivot in front and rear directions x1 and x2 and in left and right directions y1 and y2 while the drone is in flight. In this case, the drone may be moved in a plane in a direction in which the lever 40 is tilted. Further, when the lever 40 is moved vertically, the drone may be moved upward or downward vertically.

The lever 40 has an opening 11 through which the user's finger may pass. Further, the opening 11 may be disposed such that the user's thumb is inserted into the opening 11 in a state in which the user holds the main body 20. Specifically, referring to FIGS. 1 to 3, the user holds the main body 20 with the right hand 4. Further, the thumb of the user's right hand 4 is inserted into the opening 11 of the lever 40. The inserted thumb may tilt the lever 40 in the front and rear directions x1 and x2 and the left and right directions y1 and y2. When the lever 40 is tilted in the front and rear directions x1 and x2 and the left and right directions y1 and y2, the drone may be moved in the front and rear directions x1 and x2 and the left and right directions y1 and y2.

In addition, the lever 40 (more specifically, a finger ring 10) may be pressed by the finger, which passes through the opening 11, in a direction away from the main body 20 (in an upward direction z1), or in a direction close to the main body 20 (in a downward direction z2). The drone may be moved upward in the upward direction z1 based on the ground surface when the lever 40 is pressed in the upward direction z1, and the drone may be moved downward in the downward direction z2 based on the ground surface when the lever 40 is pressed in the downward direction z2.

The lever 40 may be pressed in the upward direction z1 or the downward direction z2 while simultaneously being tilted in the front and rear directions x1 and x2 or the left and right directions y1 and y2. This operation may be referred to as a complex operation. When the lever 40 is complexly operated, the drone may be moved in a direction of the complex operation. For example, when the lever 40 is pressed in the upward direction z1 while simultaneously being tilted in the left direction, the drone may be moved upward based on the ground surface while simultaneously moving in the left direction.

The button unit 30 is positioned on the main body 20, and formed to be operable such that the drone may be rotated.

The drone may be rotated about at least one of an X-axis, a Y-axis, and a Z-axis. Among the drones, there may be a drone which cannot fly in a state in which the main body of the drone is reversed, and a drone which can fly in a state in which the drone itself is reversed. The drone, which cannot fly in a state in which the main body is reversed, may rotate about the Z-axes r1 and r2. Further, the drone, which can fly in a state in which the main body is reversed, may also be rotated about the X-axes r3 and r4 or the Y-axes r5 and r6.

The button unit 30 may be movably connected to the main body 20. The button unit 30 is positioned at a reference point in a case in which no force is applied to the button unit 30 from the outside. The drone is configured to be rotated when the button unit 30 is moved.

A portion where the button unit 30 is disposed on the main body 20 is a portion where the index finger or the middle finger is disposed when the user holds the main body 20. For example, the button unit 30 may be disposed such that the button unit 30 is positioned at a portion in the vicinity of a portion where the index finger or the middle finger is positioned when the user holds the main body 20. Specifically, referring to FIG. 1, the button unit 30 may be disposed such that the middle finger, among the user's fingers, is positioned on the button unit 30 when the user holds the main body 20 with the right hand 4. This configuration enables the user to operate the lever 40 with the thumb, and to operate the button unit 30 with the index finger or the middle finger.

The button unit 30 may be formed to be movable in a circumferential direction of the main body 20. In this case, a spring such as an elastic member is mounted in the button unit 30, and may produce restoring force when the button unit 30 is pressed in one direction. Therefore, when force applied to the button unit 30 is eliminated, the button unit 30 may return back to the original position.

The drone may be rotated horizontally in the movement direction of the button unit 30. For example, referring to FIGS. 3 and 4, when the button unit 30 is pushed in a first direction r1, the drone may be rotated clockwise r1. Further, when the button unit 30 is pushed in a second direction r2, the drone may also be rotated counterclockwise r2.

Meanwhile, the button unit 30 may be rotatably connected to the main body 20. That is, like a wheel, the button unit 30 may be connected to the main body 20 so as to be rotatable in place without being moved with respect to the main body 20. In this case, when the button unit 30 is rotated clockwise or in the first direction r1, or counterclockwise or in the second direction r2, the drone may be rotated clockwise or counterclockwise in a direction identical to the rotation direction of the button unit 30.

Hereinafter, referring to FIG. 3, the configuration of the drone controller 100 will be described in detail below.

The lever 40 includes the finger ring 10, a rod 41, a lever sensor 42, a lever sensor support 43, and a hinge 44.

The finger ring 10 is a ring having the opening 11 formed at an upper portion of the lever 40. The user's finger may be inserted into the finger ring 10. When the lever 40 receives force and is tilted, the lever sensor 42 may sense a direction in which the lever 40 is tilted and an angle at which the lever 40 is tilted. Here, the tilting direction is a direction with respect to the front, rear, left, and right directions, and the direction may be complexly adjusted. For example, the lever 40 may be tilted in a diagonal direction directed from a front side toward a right side. In addition, an angle formed between the lever 40 and the main body 20 is 90 degrees when the lever 40 is not operated, and in this case, a speed at which the drone moves may be changed in accordance with an angle at which the lever 40 is tilted. As the lever 40 is tilted more greatly, the drone may be moved more quickly.

The rod 41 is a rod which connects the lever sensor 42 and the finger ring 10. Meanwhile, the rod 41 and the finger ring 10 may be connected by the hinge 44. The hinge 44 may smoothly transmit force, which is applied to the finger ring 10, to the rod 41.

The lever sensor support 43 supports the lever sensor 42, and the lever sensor 42 detects a tilting angle, thereby determining a speed at which the lever 40 is moved. When the lever 40 is tilted at a small angle, the drone may move comparatively slowly in the corresponding direction, and when the lever 40 is tilted at a large angle, the drone may move comparatively quickly in the corresponding direction.

Meanwhile, an extension support may be formed below the lever sensor support 43. The extension support may include a first support 51 which extends in a longitudinal direction of the main body 20, and a second support 52 which extends from an end portion of the first support 51 in a diameter direction of the main body 20.

A spring 55 may be inserted between the second support 52 and a lower side of the main body 20. A partition 53 may be formed at a middle portion of the main body 20. The spring 55 may also be inserted between the partition 53 and the second support 52. The springs 55 serve to fix a position of the extension support so that the extension support is not lopsided downward or upward in a state in which there is no outside force.

A first sensor and a second sensor may be disposed at a lower side of the partition 53 and at the lower side of the main body 20, respectively. When the user presses the finger ring 10 in the upward direction z1, the spring 55 between the partition 53 and the second support 52 is compressed. In this case, the compressed spring 55 presses the first sensor with higher force, and the first sensor may generate a signal for moving the drone upward. Further, when the user presses the finger ring 10 in the downward direction z2, the spring 55 between the lower side of the main body 20 and the second support 52 may be compressed. The compressed spring 55 presses the second sensor with higher force, and the second sensor may generate a signal for moving the drone downward.

Figure 5:
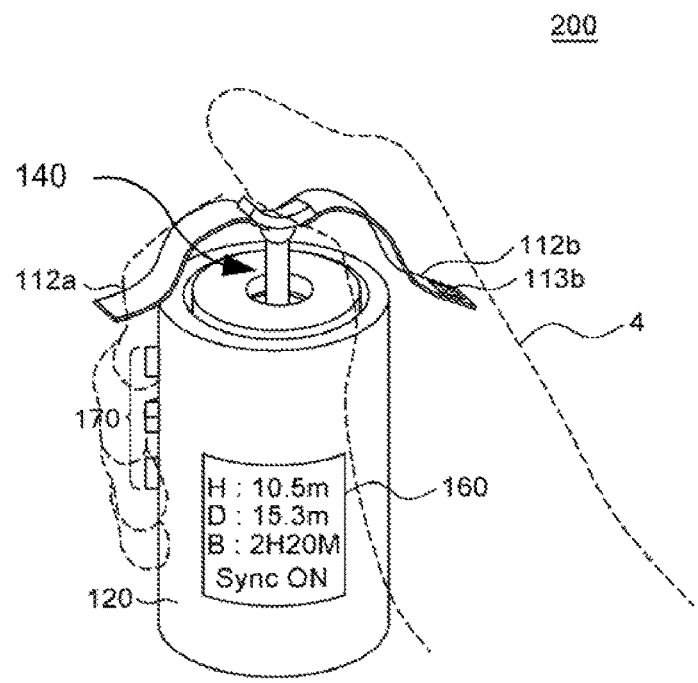
FIG. 5 is a perspective view illustrating a drone controller according to another exemplary embodiment of the present invention.
Figure 6:
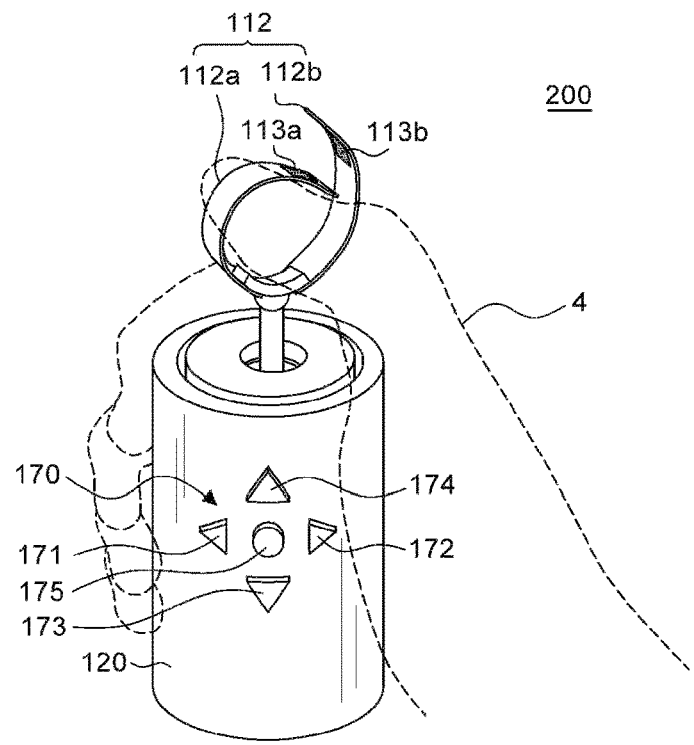
FIG. 6 is a perspective view of the drone controller illustrated in FIG. 5 when viewed in another direction.

FIG. 5 is a perspective view illustrating a drone controller 200 according to another exemplary embodiment of the present invention. FIG. 6 is a perspective view of the drone controller 200 illustrated in FIG. 5 when viewed in another direction.

The drone controller 200 according to another exemplary embodiment of the present invention is different from the drone controller 100 illustrated in FIGS. 1 to 3 only in that a configuration of the button unit 170, a display 160, and a band unit 112 are added, but because the other constituent elements of the drone controller 200 are identical or similar to those of the drone controller 100, descriptions thereof will be omitted.

Referring to the drawings, the lever 140 may further have the band unit 112 which is positioned at an end portion of the lever and surrounds the user's finger (particularly, the thumb) so that the finger is in close contact with the lever. Specifically, the band unit 112 may include a first band 112a and a second band 112b.

The first band 112a and the second band 112b are attached to the end portion of the lever so as to be spread toward both sides. The first band 112a and the second band 112b may be attached to each other while surrounding the thumb in a state in which the thumb is placed on the end portion of the lever. Velcro 113a and 113b may be attached to portions of the first band 112a and the second band 112b, which overlap each other, so as to correspond to each other. The first band 112a and the second band 112b may be attached and detached by the Velcro.

The band unit brings the thumb into close contact with the lever, and as a result, it is possible to improve elaboration and agility when the user operates the lever. In addition, the band unit brings the thumb into close contact with the lever, and as a result, it is possible to prevent the lever and the finger from being separated from each other when operating the lever.

The button unit 170 may include a plurality of button keys 171, 172, 173, and 174 formed to be pushed. The button keys 171, 172, 173, and 174 may be disposed at a predetermined portion of the main body 120 so as to be adjacent to one another in four directions including a rightward direction 171, a leftward direction 172, a downward direction 173, and an upward direction 174. The drone may be moved upward based on the ground surface when the upward button key 174 is pushed, the drone may be moved downward based on the ground surface when the downward button key 173 is pushed, the drone may be rotated counterclockwise when the leftward button key 172 is pushed, and the drone may be rotated clockwise when the rightward button key 171 is pushed. The lever 140 may be operated to be tilted so that the drone moves in the left and right directions and the front and rear directions.

As described above, the drone may be moved upward or downward based on the ground surface when the lever 140 is pressed upward or downward, and the upward button key 174 and the downward button key 173 may serve to additionally and minutely adjust the upward and downward movements of the drone.

Meanwhile, unlike the configuration illustrated in the drawings, only the rightward button key 171 and the leftward button key 172 are provided to rotate the drone leftward or rightward. In addition, in the case of the drone which can fly in a state in which the drone is reversed, an operation of rotating the drone about the X-axis or the Y-axis may be performed. In this case, as described in the aforementioned exemplary embodiment, the upward and downward movements of the drone may be operated by pressing the lever 140 upward or downward.

The main body 120 may further include a sync button key 175. The sync button key 175 may be disposed at a center of the button unit 170. When the sync button key 175 is pushed, the horizontal movement of the drone may coincide with a direction, in which the lever pivots, on an absolute coordinate. In other words, the direction in which the lever 140 pivots and the direction in which the drone moves may coincide with each other.

When the drone is horizontally rotated, a direction toward which the user is directed and a direction of a front side of the drone may be different from each other. In this case, when the user moves the drone forward, the direction in which the drone moves may be different from the direction desired by the user. Assuming that the front direction toward which the user is directed is a direction in which the button unit 170 of the controller is formed, the front direction of the drone also coincides with the direction in which the button unit 170 of the controller is formed. Therefore, it is possible to reduce confusion that may be experienced by the user when operating the controller.

When the sync button key 175 is pushed, the front direction of the drone may coincide with the direction in which the button unit 170 is formed on the controller. Various methods may be used regarding this method. For example, in a first method, the drone is rotated so that the direction in which the button unit 170 of the controller is formed coincides with the front direction of the drone. In a second method, the front direction of the drone is set back to the direction in which the button unit 170 of the controller is formed so that the front direction of the drone coincides with the direction in which the button unit 170 of the controller is formed. With other methods, it is possible to allow the front direction of the drone to coincide with the direction in which the button unit 170 of the controller is formed. Meanwhile, unlike the configuration illustrated in the drawings, the sync button key 175 may be formed at another position.

The main body 120 may further include the display 160. The display 160 may display a distance between the drone and the controller and a state of the controller. Specifically, the display 160 may display a current height H of the drone, a straight distance D between the drone and the controller, an expected remaining battery time B of the controller, and an ON/OFF situation of the sync button. In addition, the display 160 may display other necessary information.

Figure 7:
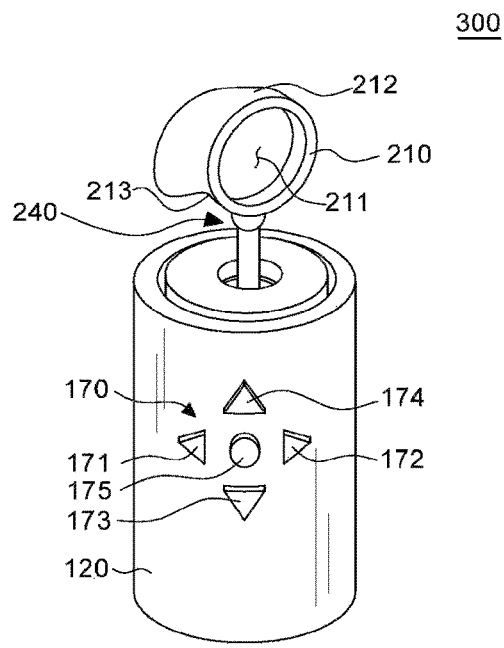
FIG. 7 is a perspective view illustrating a drone controller according to still another exemplary embodiment of the present invention.

FIG. 7 is a perspective view illustrating a drone controller according to still another exemplary embodiment of the present invention.

A drone controller 300 according to still another exemplary embodiment of the present invention is different from the drone controller 200 illustrated in FIGS. 5 and 6 only in terms of a shape of the lever 240, but because the other constituent elements of the drone controller 300 are identical or similar to those of the drone controller 200, descriptions thereof will be omitted.

The drone controller 300 according to still another exemplary embodiment of the present invention further includes a cover unit 212.

The drone controller 300 further includes the cover unit 212 which is disposed at one side of an opening 211 and surrounds the finger passing through the opening 211. Specifically, the cover unit 212 is provided to cover the finger when the finger is inserted at one side of the finger ring 210.

The cover unit 212 may increase an area with which the finger comes into contact when the lever 240 is tilted. Therefore, the lever 240 may be more effectively tilted. In addition, the cover unit 212 restricts a direction in which the user's thumb is inserted, and as a result, it is possible to prevent the user from holding the controller in an incorrect direction.

Meanwhile, the cover unit 212 may further include a curved projection 213 which is formed at a lower side adjacent to the opening 211 and formed to be curved so that the finger passing through the opening 211 is caught by the curved projection 213 when the finger is withdrawn from the opening 211. The user's thumb is folded downward by the finger joint when the user pulls the finger ring 210 with the thumb, and the finger may be more effectively caught by the curved projection 213. Therefore, the curved projection 213 may prevent the user's finger from being withdrawn from the finger ring 210 when the user pulls the finger ring 210. In addition, the curved projection 213 enables the user to more effectively pull the lever 240 when the user pulls the finger ring 210.

FIGS. 8 to 11 are perspective views illustrating drone controllers according to yet another exemplary embodiment of the present invention.

Drone controllers 400, 500, 600, and 700 according to yet another exemplary embodiment of the present invention are different from the drone controller 100 illustrated in FIGS. 1 to 3 in terms of shapes of main bodies 420, 520, 620, and 720, but because the other constituent elements of the drone controllers 400, 500, 600, and 700 are identical or similar to those of the drone controller 100, descriptions thereof will be omitted.

Figure 8:
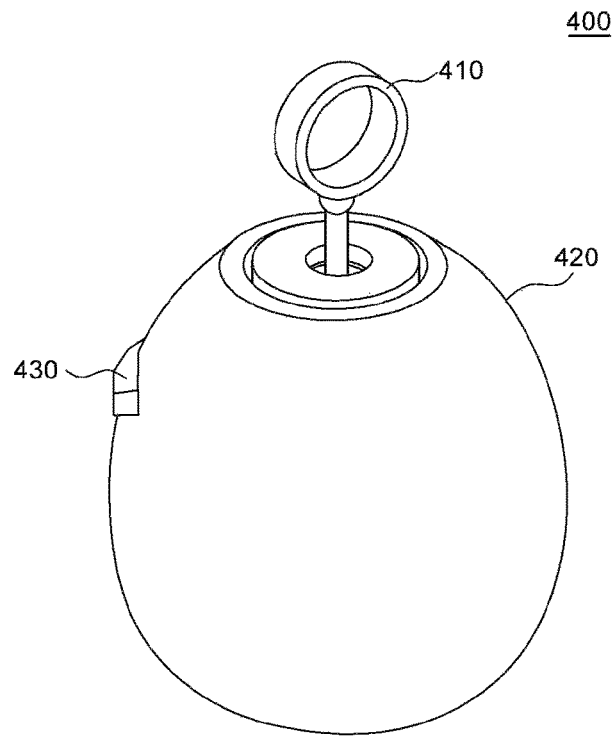
FIGS. 8 to 11 are perspective views illustrating drone controllers according to yet another exemplary embodiment of the present invention.

Referring to FIG. 8, the main body 420 is formed in an elliptical shape elongated vertically. In this case, a cross section of the main body 420 may have a circular shape or an elliptical shape. In the main body 420, a diameter of an upper side close to the finger ring 410 is small, and the diameter is increased toward a lower side of the main body 420. The diameter is decreased to allow the user to operate the finger ring 410 and the button unit 430. In addition, a diameter of a lower side may be increased to improve the user's gripping feeling.

Figure 9:
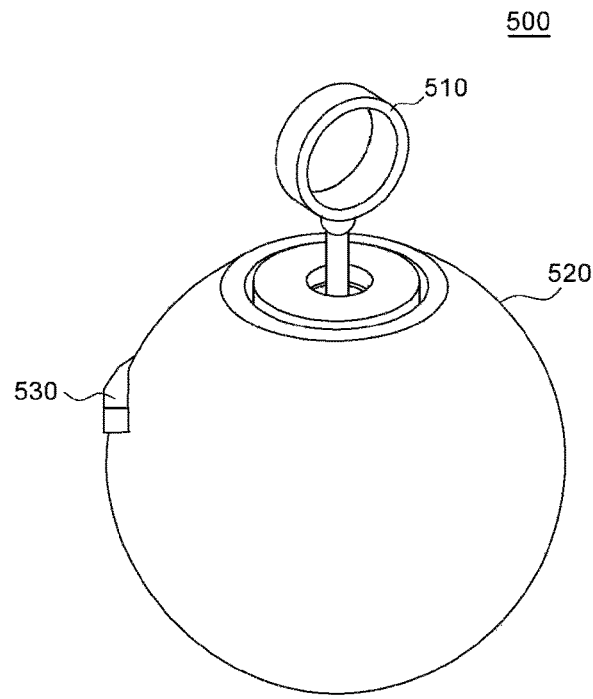

Referring to FIG. 9, the main body 520 has a shape close to a spherical shape. In this case, a cross section of the main body 520 may have a circular shape or an elliptical shape. A diameter of a central portion may be increased to improve the gripping feeling in respect to the main body 520.

Figure 10:
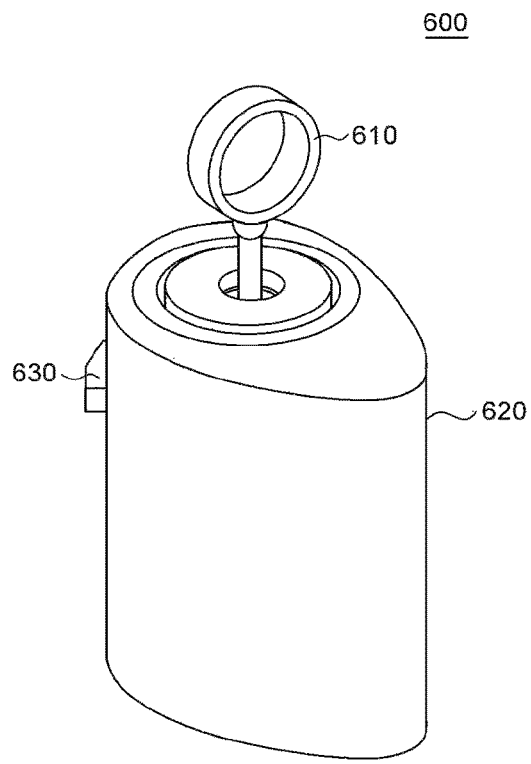

Referring to FIG. 10, a cross section of the main body 620 has a column shape close to an egg shape. In the cross section of the main body 620, a portion where the button unit 630 is disposed is thicker than the other portions.

Figure 11:
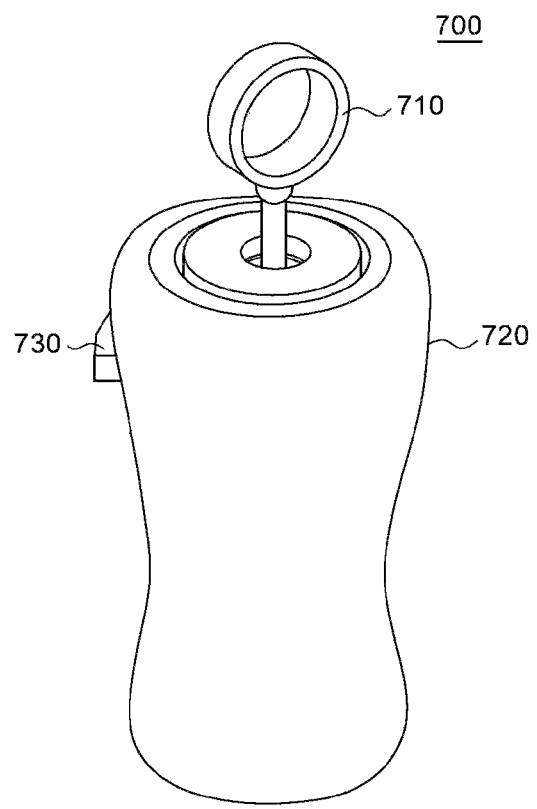

Referring to FIG. 11, a cross section of the main body 720 has a column shape close to an approximately circular shape. Further, a width of the cross section of the main body 720 may be decreased from an upper side close to the finger ring to a lower side and then increased again. That is, a width of a central portion of the main body 720 is small. The reason is to improve gripping feeling when the user grips the main body 720.

Meanwhile, the shape of the main body is not limited to the shapes illustrated in FIGS. 8 to 11, but the main body has various shapes, and thus the main body has a shape that allows the user to conveniently grip the main body and conveniently operate the main body with one hand. In particular, the main body may have a shape that allows the user to usefully operate the lever and push or pull the button unit.

Figure 12:
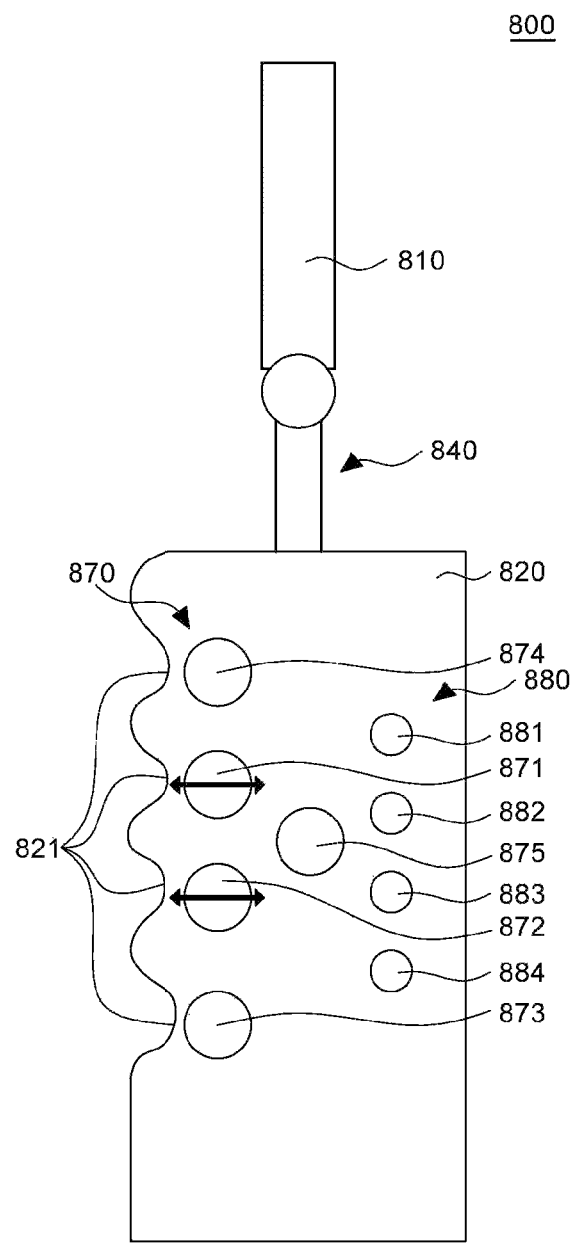
FIG. 12 is a front view illustrating a drone controller according to still yet another exemplary embodiment of the present invention.

FIG. 12 is a front view illustrating a drone controller according to still yet another exemplary embodiment of the present invention.

A drone controller 800 according to still yet another exemplary embodiment of the present invention is different from the drone controller 100 illustrated in FIG. 1 only in that recessed portions 821 are formed in a main body 820, a button unit 870 has a different shape, and a function button unit 880 is added, but because the other constituent elements of the drone controller 800 are identical or similar to those of the drone controller 100, descriptions thereof will be omitted.

The drone controller 800 according to still yet another exemplary embodiment of the present invention has the recessed portions 821 formed in the main body. Recessed curved portions are formed from an upper end side of the main body 820. The recessed portions 821 may intuitively indicate positions of the fingers except for the thumb in a state in which the user holds the main body 820. In addition, the user's remaining fingers are placed in the recessed portions 821, and as a result, the recessed portion 821 may enable the user to more stably hold the main body 820.

The button unit 870 includes four button keys 871, 872, 873, and 874 which are formed to be spaced apart from one another in a vertical direction, and a sync button key 875 which is disposed to be adjacent to the button keys 871, 872, 873, and 874. The button unit 870 is disposed at a position where ends of the index finger, the middle finger, the ring finger, and the little finger are placed when the user holds the main body 820.

Among the four button keys which are formed to be spaced apart from one another in the vertical direction, the first button key 871 and the second button key 872 are connected to the main body so as to be movable in the left and right directions. The first button key 871 and the second button key 872 may be a rotation button key for rotating the drone and a rotation-axis-direction converting button key for setting the axes (x-axis, y-axis, and z-axis) about which the drone is rotated. In addition, the third button key 873 may be a speed converting key for converting a movement speed of the drone into a relatively slow state and a relatively fast state. The fourth button key 874 may be a flip key for reversing the drone from the current state. Meanwhile, the positions and the respective operating functions of the first to fourth button keys may be changed.

The function button unit 880 is positioned at a portion which is not covered by the palm when the user holds the main body 820. The function button unit 880 includes four function button keys 881, 882, 883, and 884 which are formed to be spaced apart from one another in the vertical direction. However, the number of function button keys is not limited thereto, and the number of function button keys may be increased as necessary, or the number of function button keys may be decreased by allowing different functions to be performed by pushing the same button key several times.

The function button unit 880 includes first to fourth function button keys 881, 882, 883, and 884 for performing functions for automatically controlling the drone.

The first function button key 881 may perform a follow function that allows the drone to follow the user while maintaining a predetermined distance from the user when the first function button key 881 is pushed. The second function button key 882 may perform a back home function that allows the drone to return back to a position where the drone initially starts or allows the drone to return back to the user's current position when the second function button key 882 is pushed. The third function button key 883 may perform a hovering function that fixes a position of the drone in a state in which the drone floats in the air when the third function button key 883 is pushed. The fourth function button key 884 may perform a rounding function that allows the drone to continuously round circularly about a certain point while maintaining a predetermined distance from the point when the fourth function button key 884 is pushed. However, at least one of the first to fourth function button keys 881, 882, 883, and 884 may be configured to be movable in the left and right directions, and the functions performed by the first to fourth function button keys 881, 882, 883, and 884 may be changed.

One or more function button keys may be provided on the drone controller, but there is a limitation in performing various functions related to the drone by using the function button keys provided on the drone controller. In addition, in consideration of specificity of the drone controller having portability, a size of the drone controller is inevitably restricted, and it is impossible to perform all of the functions that may be performed by the drone by using one or more function button keys.

To solve the aforementioned problem, the drone controller according to the present invention may change the functions preset to the function button keys to other functions depending on the user's input. For example, in a state in which a first function is set to the first function button key, the drone controller may set a second function, which is different from the first function, to the first function button key depending on the user's input. Thereafter, when the first function button key is pushed, a control command corresponding to the second function is transferred to the drone, and as a result, the drone performs the second function.

In a case in which the drone controller according to the present invention is connected to a terminal having a display, a user interface, which enables the user to change the functions provided in the drone controller, may be outputted to the display. With the user interface, the user may ascertain one or more function button keys provided on the drone controller and functions set to the one or more function button keys, and the user may change the preset functions to other functions.

The functions, which may be set to the function button keys, may include a sync function, a display function, a flip function, a back home function, a back past function, a follow me function, a rounding function, a boost function, a dodge function, and a landing function.

The sync function is a function that changes a control reference axis so that a direction in which the drone moves forward coincides with a direction of the user's line of sight.

The display function is a function that allows the drone to move along a programmed movement trajectory.

The flip function is a function of rotating an imaginary axis set to the drone. For example, the flip function may be a function that allows the drone to be reversed by being rotated by 180 degrees.

The back home function is a function that allows the drone to return back to a position where the drone controller is positioned.

The back past function is a function that moves the drone to the preset position.

The follow me function is a function that allows the drone to follow the drone controller while satisfying at least one of a predetermined distance and a predetermined altitude from the drone controller. At least one of the distance and the altitude may be changed depending on the user's input.

The rounding function is a function that allows the drone to rotate about a particular point.

For example, the rounding function may be a function that allows the drone to rotate about a position where the drone controller is positioned in a state in which the drone is spaced apart from the position at a predetermined distance. The predetermined distance may be changed depending on the user's input.

The boost function may be a function that rapidly increases a speed of the drone to a preset speed.

The dodge function is a function that allow the drone to automatically avoid an object within a predetermined distance regardless of control of the drone controller.

The landing function is a function that allows the drone to safely land on the ground while slowly moving downward.

Meanwhile, various functions related to the drone are being newly and continuously developed, and the user wishes to apply the new function to the drone controller.

To meet the need, the drone controller may be connected to a terminal or a server in a wired/wireless manner and may download a new function, and the downloaded function may be set to the function button key provided on the drone controller. For example, the user may download a new function from a preset server by using the terminal, and may install the new function to the drone controller by connecting the drone controller to the terminal. Subsequently, the user may set the new function to any one function button key disposed on the drone controller so as to the new function by using the function button key.

Figure 13:
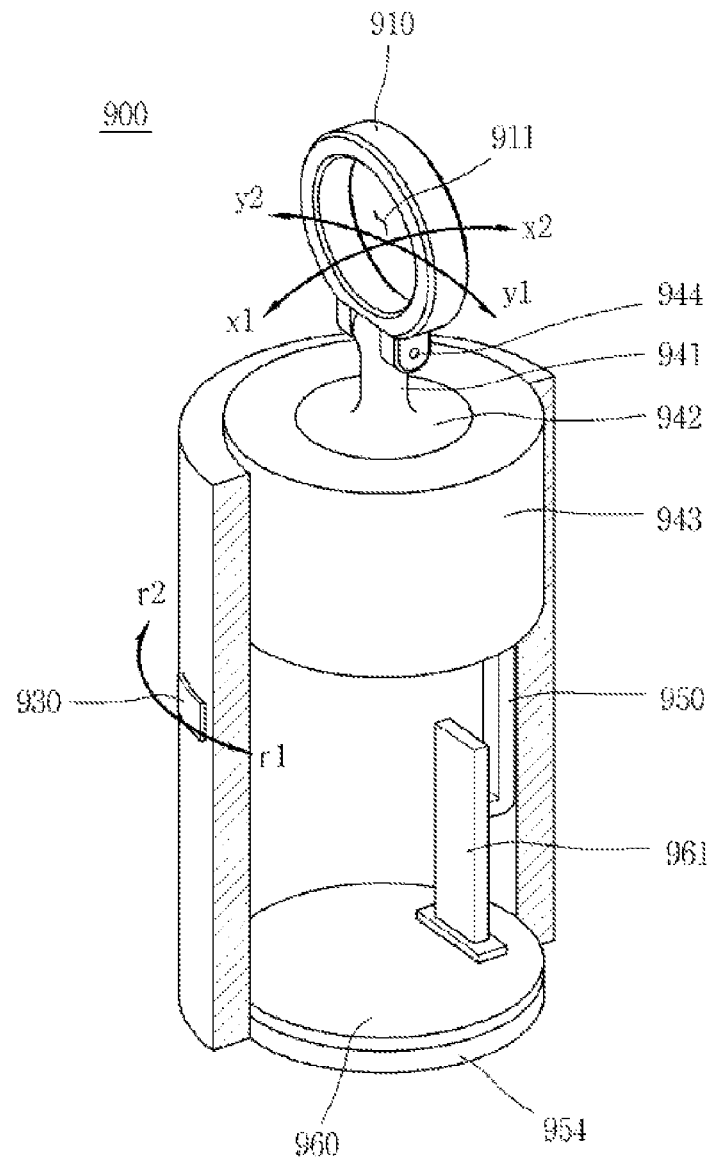
FIG. 13 is a conceptual view illustrating a drone controller according to a further exemplary embodiment of the present invention.

FIG. 13 is a conceptual view illustrating a drone controller according to a further exemplary embodiment of the present invention.

A drone controller 900 is a controller configured to control a rotation and a movement of the drone (see FIG. 4) in a wireless manner. The drone controller 900 includes a main body 920, a lever 940, and a button unit 930.

The main body 920 is formed to be held by a user with one hand. Further, the main body 920 may be formed in a shape that enables the user to operate the drone in a state in which the user may hold the main body 20 with one hand. For example, the main body 920 may be formed in a cylindrical shape. That is, a circular diameter is determined so that the cylindrical main body 920 has a perimeter which may be held by an adult user with one hand. For example, the user may support the main body 920 by surrounding a half or more than a half of the perimeter of the main body 920 with the hand.

Meanwhile, although not illustrated in the drawings, recessed portions may be formed in the main body 920 so that fingers other than the thumb may be placed in the recessed portions when the user holds the main body 920. That is, the main body 920 may be recessed in a direction in which the user's fingers hold the main body 920. The main body 920 may be formed such that the user's fingers may be placed in the recessed portions of the main body 920 when the user holds the main body 920. Since the user's finger is placed in the recessed portion, the user's finger is caught by portions protruding at both sides of the recessed portion. As a result, the main body 920 may be more stably supported by the user's fingers. A degree to which the main body 920 is recessed is set to a degree which enables the user to sufficiently support the main body 920, and the degree may be clearly understood by those skilled in the art.

The lever 940 may be connected to the main body 920 so as to be pivotable with respect to the main body 920. Further, the lever 940 may be connected to the main body 920 so as to be movable vertically with respect to the main body 920. The lever 940 may pivot in front and rear directions x1 and x2 and in left and right directions y1 and y2 while the drone is in flight. In this case, the drone may be moved in a plane in a direction corresponding to a direction in which the lever 940 is tilted. Further, when the lever 940 is moved upward and downward, an output of the drone may be increased or decreased, and therefore, the drone may be moved upward or downward in the vertical direction.

A finger ring 910 is formed at an end portion of the lever 940 which is exposed to the outside of the main body 920. The finger ring 910 has an opening 911 through which the user's finger may pass. Further, the opening 911 may be disposed such that the user's thumb is inserted into the opening 11 in a state in which the user holds the main body 920.

The user's thumb may be inserted through the opening 911, and placed on an inner surface of the finger ring 910. The lever 940 may be tilted in the front and rear directions x1 and x2 and the left and right directions y1 and y2 by the thumb inserted into the opening 911. When the lever 940 is tilted in the front and rear directions x1 and x2 and the left and right directions y1 and y2, the drone may be moved in the front and rear directions x1 and x2 and the left and right directions y1 and y2.

In addition, the lever 940 (more specifically, a finger ring 910) may be pressed by the finger, which passes through the opening 911, in a direction away from the main body 920 (in the upward direction z1), or in a direction close to the main body 920 (in the downward direction z2). When the lever 940 is pressed in the upward direction z1, an output of the drone may be increased, and therefore, the drone may be moved upward based on the ground surface in the upward direction z1. When the lever 940 is pressed in the downward direction z2, an output of the drone may be decreased, and therefore, the drone may be moved upward based on the ground surface in the downward direction z2.

The lever 940 may be pressed in the upward direction z1 or the downward direction z2 while simultaneously being tilted in the front and rear directions x1 and x2 or the left and right directions y1 and y2. This operation may be referred to as a complex operation. When the lever 940 is complexly operated, the drone may be moved in a direction of the complex operation. For example, when the lever 940 is pressed in the upward direction z1 while simultaneously being tilted in the left direction, the drone may be moved upward based on the ground surface while simultaneously moving in the left direction.

The button unit 930 is positioned on the main body 920, and formed to be operable such that the drone may be rotated.

The drone may be rotated about at least one of an X-axis, a Y-axis, and a Z-axis. Among the drones, there may be a drone which cannot fly in a state in which the main body of the drone is reversed, and a drone which can fly in a state in which the drone itself is reversed. The drone, which cannot fly in a state in which the main body is reversed, may rotate about the Z-axes r1 and r2. Further, the drone, which can fly in a state in which the main body is reversed, may also be rotated about the X-axes r3 and r4 or the Y-axes r5 and r6.

The button unit 930 may be movably connected to the main body 920. The button unit 930 is positioned at a reference point in a case in which no force is applied to the button unit 930 from the outside. When the button unit 930 is moved by an operation of the user or the like, the drone rotates.

A portion where the button unit 930 is disposed on the main body 920 is a portion where the index finger or the middle finger is disposed when the user holds the main body 920. For example, the button unit 930 may be disposed such that the button unit 930 is positioned at a portion in the vicinity of a portion where the index finger or the middle finger is positioned when the user holds the main body 920. Specifically, referring to FIG. 13, the button unit 930 may be disposed such that the index finger or the middle finger, among the user's fingers, is positioned on the button unit 930 when the user holds the main body 920 with the right hand. This configuration enables the user to operate the lever 940 with the thumb, and to operate the button unit 930 with the index finger or the middle finger.

The button unit 930 may be formed to be movable in a circumferential direction of the main body 920. In this case, a spring such as an elastic member is mounted in the button unit 930, and may produce restoring force when the button unit 930 is pressed in one direction. Therefore, when force applied to the button unit 930 is eliminated, the button unit 930 may return back to the original position.

The drone may be rotated horizontally in the movement direction of the button unit 930. For example, when the button unit 30 is pushed in a first direction r1, the drone may be rotated clockwise r1. Further, when the button unit 930 is pushed in a second direction r2, the drone may also be rotated counterclockwise r2.

Meanwhile, the button unit 930 may be rotatably connected to the main body 920. That is, like a wheel, the button unit 930 may be connected to the main body 920 so as to be rotatable in place without being moved with respect to the main body 920. In this case, when the button unit 930 is rotated clockwise or in the first direction r1, or counterclockwise or in the second direction r2, the drone may be rotated clockwise or counterclockwise in a direction identical to the rotation direction of the button unit 930.

The lever 940 includes the finger ring 910, a rod 941, a lever sensor 942, a lever sensor support 943, and a hinge 944.

The finger ring 910 is a ring having the opening 911 formed at an upper portion of the lever 940. The finger ring 910 is configured to accommodate the user's finger. The user's finger may be inserted into the finger ring 910.

When the lever 940 receives force and is tilted, the lever sensor 942 may sense a direction in which the lever 940 is tilted and an angle at which the lever 940 is tilted. Here, the tilting direction is a direction with respect to the front, rear, left, and right directions, and the direction may be complexly adjusted. For example, the lever 940 may be tilted in a diagonal direction directed from a front side toward a right side. In addition, an angle formed between the lever 940 and the main body 920 is 90 degrees when the lever 940 is not operated, and in this case, a speed at which the drone moves may be changed in accordance with an angle at which the lever 940 is tilted. As the lever 940 is tilted more greatly, the drone may be moved more quickly.

The rod 941 is a rod which connects the lever sensor 942 and the finger ring 910. Meanwhile, the rod 941 and the finger ring 910 may be connected by the hinge 944. The hinge 944 may smoothly transmit force, which is applied to the finger ring 910, to the rod 941.

The lever sensor support 943 supports the lever sensor 942, and the lever sensor 942 detects a tilting angle, thereby determining a speed at which the lever 940 is moved. When the lever 940 is tilted at a small angle, the drone may move comparatively slowly in the corresponding direction, and when the lever 940 is tilted at a large angle, the drone may move comparatively quickly in the corresponding direction.

Meanwhile, an extension member 950 may be formed at a lower side of the lever sensor support 943. The extension member 950 is connected to the lever sensor support 943, and extends toward a lower side of the main body 920. The extension member 950 is configured to be connected to a vertical movement sensor 961. For example, a lower end portion of the extension member 950 may be bent and connected to the vertical movement sensor 961.

The vertical movement sensor 961 is mounted on a printed circuit board 960. The printed circuit board 960 is installed in the main body 920. In addition to the vertical movement sensor 961, a plurality of elements for substantial control of the drone controller 900, a communication module for wireless communication with the drone, and the like may be mounted on the printed circuit board 960. FIG. 13 illustrates a configuration in which the printed circuit board 960 is disposed on a lower portion 954 of the main body 920, but a position of the printed circuit board 960 is not necessarily limited thereto.

The vertical movement sensor 961 is connected to the extension member 950. The vertical movement sensor 961 is configured to detect the vertical movement of the extension member 950.

For example, the vertical movement sensor 961 may be a variable sensor. A resistance value varies in accordance with a vertical position of the extension member 950, and the variable sensor measures a change in resistance value, thereby detecting a position of the extension member 950 in the upward and downward directions. However, the vertical movement sensor 961 of the present invention is not limited to the variable sensor, and any sensor may be applied as long as the sensor may detect the position of the extension member 950 in the upward and downward directions.

When the upward movement of the extension member 950 is detected by the vertical movement sensor 961, the drone controller 900 may generate a signal for increasing an output of the drone or moving the drone in the upward direction. On the contrary, when the downward movement of the extension member 950 is detected by the vertical movement sensor 961, the drone controller 900 may generate a signal for decreasing an output of the drone or moving the drone in the downward direction. The generation of the signal may be performed by the vertical movement sensor 961 or the printed circuit board 960 and the elements mounted on the printed circuit board 960.

The lever 940 and the lever sensor support 943 are connected to each other by the rod 941 and the lever sensor 942, and the lever sensor support 943 and the extension member 950 are connected to each other. Therefore, when the user moves the finger ring 910 in the upward and downward directions in a state in which the thumb is inserted into the finger ring 910, the lever 940, the lever sensor 942, the lever sensor support 943, and the extension member 950 are also moved in the upward and downward directions. Further, the vertical movement sensor 961 detects the vertical movement of the extension member 950. Therefore, the drone controller 900 generates a signal for increasing an output of the drone or decreasing an output of the drone, and as a result, the drone may be moved in the upward direction or the downward direction.

The configuration in which as the lever 940 is tilted, the drone moves in a direction corresponding to the tilting direction of the lever 940 has been described above.

Figure 14:
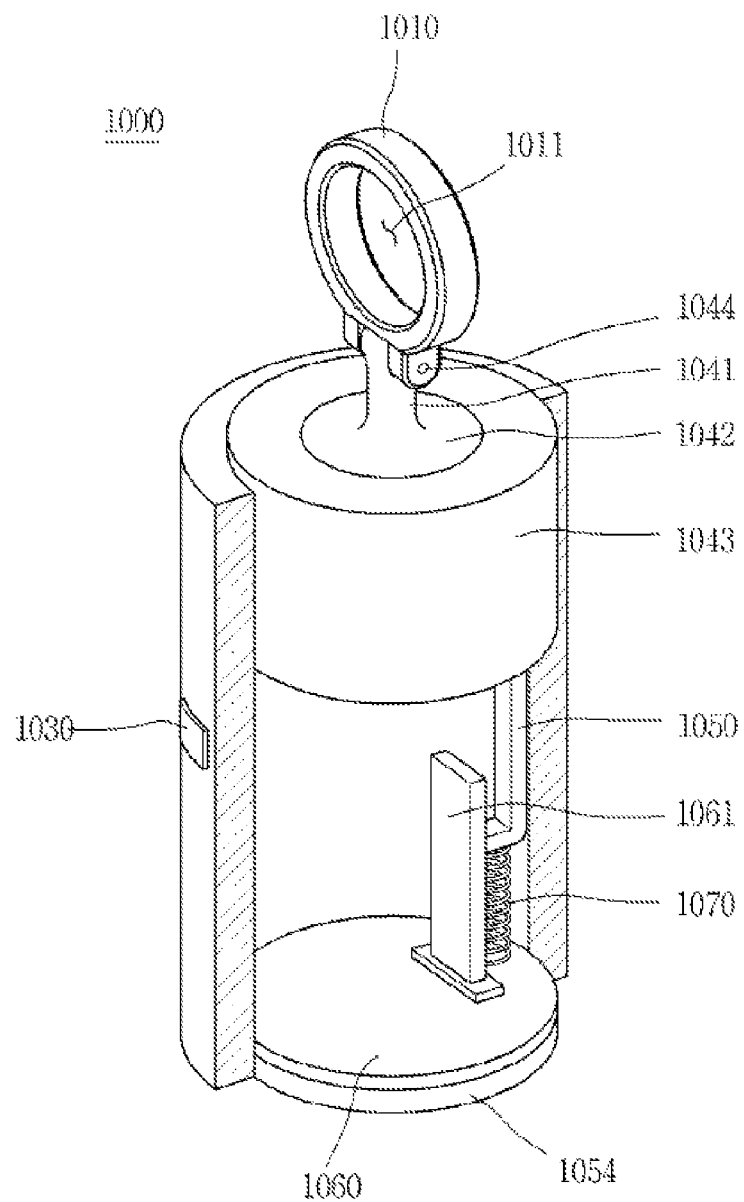
FIG. 14 is a conceptual view illustrating a drone controller according to another further exemplary embodiment of the present invention.

FIG. 14 is a conceptual view illustrating a drone controller according to another further exemplary embodiment of the present invention.

A drone controller 1000 illustrated in FIG. 14 is similar to the drone controller 900 illustrated in FIG. 13. However, the drone controller 1000 illustrated in FIG. 14 further includes an elastic member 1070 configured to support a connecting member 1050.

The elastic member 1070 is configured to provide elastic force to the connecting member 1050 in the upward and downward directions. For example, the elastic member 1070 may be implemented as a coil spring illustrated in FIG. 14, one end of the coil spring may be connected to a printed circuit board 1060, and the other end of the coil spring may be connected to the connecting member 1050.

The elastic member 1070 is configured to allow the connecting member 1050 to be positioned at a reference position in a state in which no external force is applied to the elastic member 1070. When the lever 1040 is moved in the downward direction, the connecting member 1050 is also moved in the downward direction, and the elastic member 1070 is compressed. Therefore, the elastic member 1070 stores restoring force, and when the external force is eliminated, the connecting member 1050 moves in the upward direction and returns back to the reference position by the restoring force stored in the elastic member 1070.

On the contrary, when the lever 1040 is moved in the upward direction, the connecting member 1050 is also moved in the upward direction, and the elastic member 1070 is extended. Therefore, the elastic member 1070 stores restoring force, and when the external force is eliminated, the connecting member 1050 moves in the downward direction and returns back to the reference position by the restoring force stored in the elastic member 1070.

The reference position of the connecting member 1050 is set to a position where the drone performs hovering. The hovering means a state in which an output for moving the drone upward has the same magnitude as gravity, such that the drone is stopped in the air without moving upward or downward.

When the user moves the lever 1040 in the upward direction and increases an output of the drone, the drone is moved upward. Sequentially, when force applied to the lever 1040 is eliminated, the connecting member 1050 returns back to the reference position, and the drone outputs an output for hovering. Therefore, in a case in which the user does not additionally operate the lever 1040, the drone mounts the hovering state.

The reference position may vary depending on the type of drone. Therefore, in a case in which the type of drone, which is paired with the drone controller 1000, is changed, the reference position is also changed. The drone controller 1000 may be configured to reset the reference position by receiving feedback in respect to the reference position from the drone. Therefore, the drone controller 1000 may universally operate regardless of the type of drone.

Further, the reference position may be changed even in the case of the identical drones, and similarly, the drone controller 1000 is configured to reset the reference position by receiving feedback in respect to the reference position from the drone. A sensor for detecting the hovering of the drone may be mounted in the drone.

Figure 15:
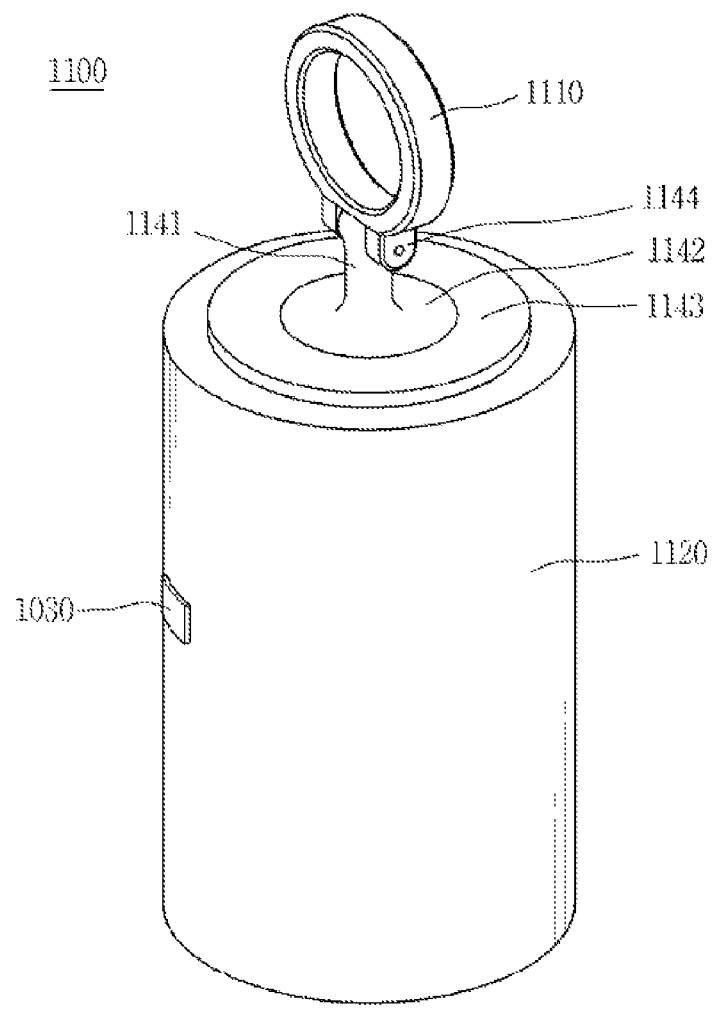
FIG. 15 is a conceptual view illustrating a connection structure between a finger ring and a rod.

FIG. 15 is a conceptual view illustrating a connection structure between a finger ring 1110 and a rod 1141.

A configuration in which the finger ring 1110 and the rod 1141 may be connected to each other by the hinge has been described above. FIG. 15 illustrates a hinge connection structure between the finger ring 1110 and the rod 1141 which are coupled by a pin 1144.

A lower end of the finger ring 1110 is formed to surround an upper end of the rod 1141 from both sides. The pin 1144 is installed to penetrate both a lower end of the finger ring 1110 and the upper end of the rod 1141. Therefore, the finger ring 1110 and the rod 1141 may be coupled.

Since the finger ring 1110 and the rod 1141 are connected to each other by the pin 1144, the finger ring 1110 and the rod 1141 may rotate relative to each other about the pin 1144.

When the user presses the finger ring 1110 forward and tilts the rod 1141, the finger ring 1110 is rotated about the pin 1144 at a predetermined angle rearward in a direction opposite to the tilting direction of the rod 1141. On the contrary, when the user presses the finger ring 1110 rearward and tilts the rod 1141, the finger ring 1110 is rotated about the pin 1144 at a predetermined angle forward in a direction opposite to the tilting direction of the rod 1141.

The structure in which the finger ring 1110 and the rod 1141 are connected to each other by the pin 1144 serve to maximize operating characteristics of the drone controller 1100 configured to control the drone only with the thumb. In comparison with a case in which the finger ring 1110 and the rod 1141 are integrally formed, the rod 1141 may be more greatly tilted and an easier operation may be implemented in a case in which the finger ring 1110 and the rod 1141 are connected to each other by the pin 1144 so as to be relatively rotatable.

Figure 16:
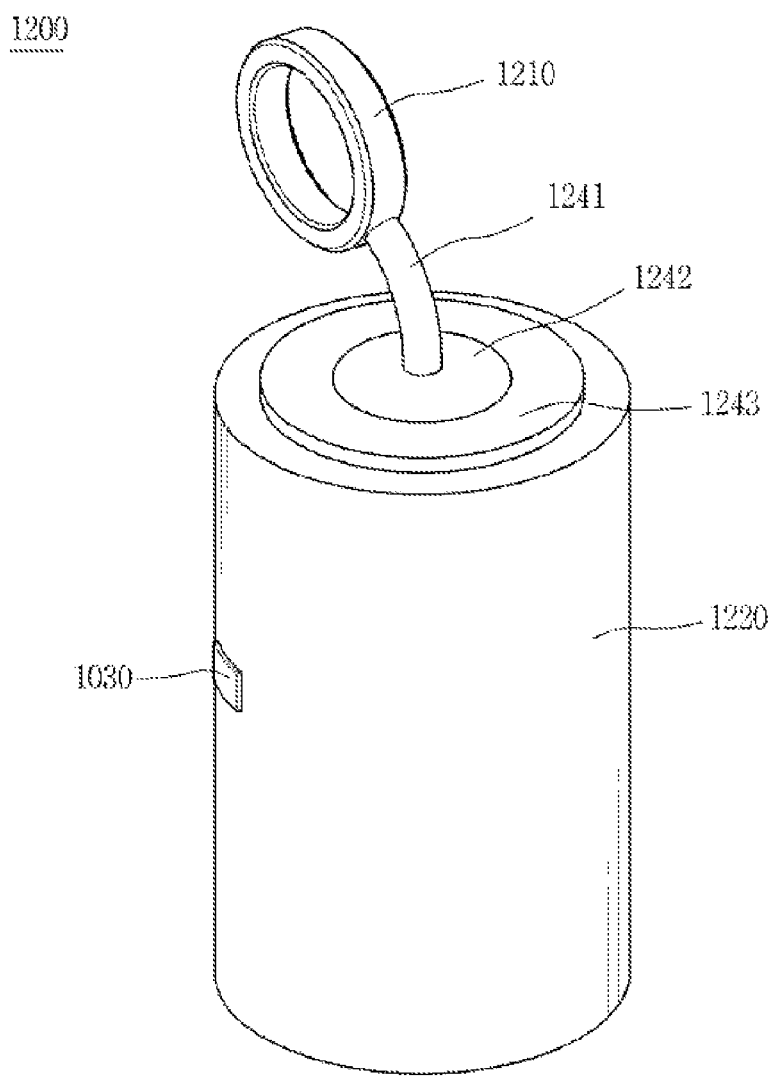
FIG. 16 is a conceptual view illustrating another connection structure between the finger ring and the rod.

FIG. 16 is a conceptual view illustrating another connection structure between a finger ring 1210 and a rod 1241.

The rod 1241 may be made of an elastic material. For example, the rod 1241 may be made of rubber, but the present invention is not necessarily limited thereto. When the rod 1241 has elastic force, the rod 1241 may be bent by the user's operation. In addition to the rod 1241, the finger ring 1210 may also be made of an elastic material.

The reason why the rod 1241 is made of an elastic material is to maximize operating characteristics of the drone controller 1200 configured to control the drone only with the thumb. The rod 1241 may be more greatly tilted and an easier operation may be implemented in a case in which the rod 1241 is bent in comparison with a case in which the rod 1241 is not bent.

Figure 17A:
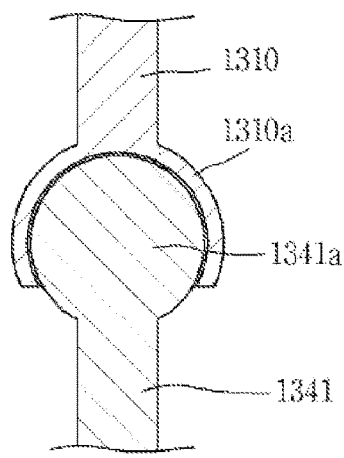
FIGS. 17A to 17C are conceptual views illustrating still another connection structure between the finger ring and the rod.
Figure 17B:
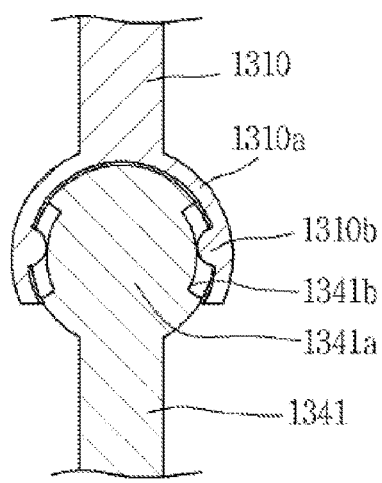
Figure 17C:
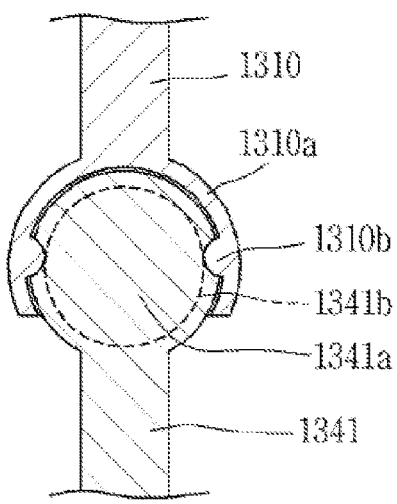

FIGS. 17A to 17C are conceptual views illustrating still another connection structure between the finger ring and the rod.

First, referring to FIG. 17A, a ball (sphere) 1341*a* is formed at an upper end of a rod 1341. A socket 1311*a*, which is formed to surround at least a part of the ball 1341*a*, is formed at a lower end of a finger ring 1310. However, the positions of the socket 1311*a* and the ball 1341*a* may be changed.

A ball joint connection structure, which is implemented by the ball 1341*a* and the socket 1311*a*, provides a degree of freedom in respect to a rotation direction of the finger ring 1310. The finger ring 1110 may also be rotated likewise in the hinge connection structure illustrated in FIG. 15, but the rotation direction of the hinge connection structure is limited to two directions based on the pin 1144.

However, the ball joint connection structure provides a degree of freedom in respect to rotation direction of the finger ring 1310, and as a result, the finger ring 1310 may be rotated regardless of the direction.

The structure in which the finger ring 1310 and the rod 1341 are connected to each other by the ball joint serve to maximize operating characteristics of the drone controller 1300 configured to control the drone only with the thumb. Since the finger ring 1310 and the rod 1341 are connected to each other by the ball joint so as to be relatively rotatable, the rod 1341 may be more greatly tilted regardless of a direction, and an easier operation may be implemented.

FIGS. 17B and 17C illustrate a configuration in which grooves 1341*b* are formed in an outer circumferential surface of the ball 1341*a*, and protrusions 1310*b* are formed on an inner circumferential surface of the socket 1310*a*. The groove 1341*b* may be partially formed in the outer circumferential surface of the ball 1341*a* or may be formed along a circumference. The groove 1341b and the protrusion 1310b may set a relative rotation direction of the finger ring 1310 and the rod 1341.

Figure 18:
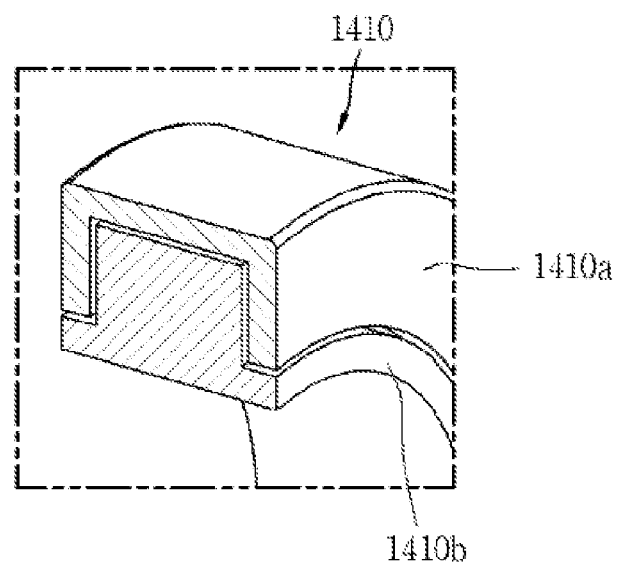
FIG. 18 is a cross-sectional view illustrating a modified example of the finger ring.

FIG. 18 is a cross-sectional view illustrating a modified example of the finger ring 1410.

The finger ring 1410 may include an outer ring 1410a and an inner ring 1410b. The outer ring 1410a surrounds at least a part of the inner ring 1410b, and the inner ring 1410b is accommodated in the inner ring 1410a.

The outer ring 1410a is connected to the rod. In contrast, the inner ring 1410b is not connected to the rod and configured to be rotated relative to the outer ring 1410a in a state in which the inner ring 1410b is accommodated in the outer ring 1410a.

A configuration in which the user's finger comes into contact with only one point of the finger ring 1410 may improve operating characteristics of the drone controller. In contrast, in a case in which the user's finger repeatedly comes into contact with several points of the finger ring 1410 as the drone controller operated, operating characteristics of the drone controller deteriorate.

In the present invention, the inner ring 1410b and the outer ring 1410a are configured to be relatively rotatable, and as a result, the user's hand inserted into the finger ring 1410 may always come into contact with any one point of the inner ring 1410b even though the user tilts the finger ring 1410 in the left and right directions. Further, operating characteristics of the drone controller may be improved.

While the exemplary embodiments of the present invention have been described with reference to the accompanying drawings, those skilled in the art will understand that the present invention may be implemented in any other specific form without changing the technical spirit or an essential feature thereof. Therefore, it should be understood that the above-described exemplary embodiments are illustrative in all aspects and do not limit the present invention.

The invention claimed is:

1. A drone controller capable of controlling motion of a drone that is configured to move in vertical directions and in horizontal directions perpendicular to the vertical directions, the drone controller comprising:
   a main body; and
   a lever connected to the main body such that the lever is pivotably moveable and vertically moveable with respect to the main body,
   wherein pivotal motion of the lever causes the drone to move in the horizontal directions, wherein vertical motion of the lever causes the drone to move in the vertical directions, wherein simultaneous combined pivotal motion of the lever and vertical motion of the lever causes the drone to move in both the horizontal and vertical directions, wherein an opening into which the user's finger is penetratively inserted is formed at an end portion of the level, wherein the opening is a ring that is directly connected to the lever by a hinge, and wherein the ring is configured to hingedly move with respect to the lever.

2. The drone controller of claim 1, further comprising:
   a button unit which is positioned on the main body and configured to cause, when the button unit is operated, the drone to rotate about at least one of a horizontal axis and a vertical axis.

3. The drone controller of claim 1, wherein the main body is configured to enable the user to hold the main body with one hand and to operate the lever while the user holds the main body.

4. The drone controller of claim 2, wherein the button unit is movably connected to the main body, the drone is rotated clockwise when the button unit is moved in a first direction based on a reference point, and the drone is rotated counterclockwise when the button unit is moved in a second direction opposite to the first direction.

5. The drone controller of claim 2, wherein the button unit is rotatably connected to the main body, the drone is rotated clockwise when the button unit is rotated clockwise, and the drone is rotated counterclockwise when the button unit is rotated counterclockwise.

6. The drone controller of claim 2, wherein the button unit includes a plurality of button keys which is formed to be pushed, the button keys are disposed at a predetermined portion of the main body such that the button keys are adjacent to one another, wherein the button has at least a leftward button key and rightward button key, wherein the drone is rotated counterclockwise about the vertical axis when the leftward button key is pushed, and the drone is rotated clockwise about the vertical axis when the rightward button key is pushed.

7. The drone controller of claim 2, wherein the main body is configured to enable the user to hold the main body with one hand and to operate the lever while the user holds the main body, wherein the button unit is disposed in the vicinity of a portion where at least one of the user's index finger, middle finger, ring finger, and little finger is positioned when the user holds the main body, and an opening into which the user's thumb is penetratively inserted is formed at an end portion of the lever.

8. The drone controller of claim 7, wherein the main body includes recessed portions that are configured to receive fingers except for the thumb when the user holds the main body.

9. The drone controller of claim 1, wherein the main body further includes a first direction and a sync button key, wherein the drone includes a front direction in the horizontal directions, and wherein pressing the sync button key causes the front direction of the drone to become aligned with and face the same direction as the first direction of the main body.

10. The drone controller of claim 1, wherein the lever further includes a band unit which is positioned at an end portion of the lever and surrounds the finger so that the user's finger is in close contact with the lever.

11. The drone controller of claim 1, further comprising:
    a cover unit which is disposed at one side of the opening and surrounds the finger passing through the opening.

12. The drone controller of claim 11, wherein the cover unit includes a curved projection which is formed at a lower side adjacent to the opening and is curved so that the finger passing through the opening is caught by the curved projection when the finger is withdrawn from the opening.

13. The drone controller of claim 1, wherein a speed of the drone is based upon an angle between the lever and the main body, and wherein changing the angle causes the speed of the drone to change.

14. The drone controller of claim 1, wherein the main body further comprises a display configured to display information relating to one or more of: the drone or the drone controller.

15. The drone controller of claim 14, wherein the display is configured to display one or more of: a distance between the drone and the drone controller, a height of the drone, or an expected remaining battery time of the controller.

16. The drone controller of claim 1, wherein the lever is connected to the main body with a ball and socket joint, wherein the main body includes a ball that has one or more grooves, wherein the lever includes a socket, and wherein the socket is positioned around at least a part of the ball and includes one or more protrusions that are positioned within the one or more grooves.

17. The drone controller of claim 1, wherein the opening is a ring that includes an inner ring and an outer ring, wherein at least a portion of the inner ring is positioned within the outer ring, and wherein the inner ring is configured to rotate within the outer ring.

* * * * *